United States Patent [19]
Ikeda

[11] Patent Number: 5,802,952
[45] Date of Patent: Sep. 8, 1998

[54] REACTION MECHANISM FOR BOOSTER

[75] Inventor: Masahiro Ikeda, Saitama-ken, Japan

[73] Assignee: Jidosha Kiki Co., Ltd., Tokyo, Japan

[21] Appl. No.: 874,373

[22] Filed: Jun. 19, 1997

[30] Foreign Application Priority Data

Jul. 5, 1996 [JP] Japan ................................. 8-195491

[51] Int. Cl.⁶ .................................................. F15B 9/10
[52] U.S. Cl. ...................... 91/369.1; 91/376 R; 91/434; 60/552
[58] Field of Search .............................. 91/369.1, 376 R, 91/434; 60/552

[56] References Cited

U.S. PATENT DOCUMENTS

| | | | |
|---|---|---|---|
| 2,796,154 | 6/1957 | Stelzer | 60/552 |
| 3,152,518 | 10/1964 | Ayers | 91/434 |
| 3,373,662 | 3/1968 | Voll et al. | 91/434 |
| 3,411,414 | 11/1968 | Brown et al. | 91/434 |
| 3,534,662 | 10/1970 | Eggstein | 91/434 |
| 5,337,650 | 8/1994 | Uyama . | |

*Primary Examiner*—F. Daniel Lopez
*Attorney, Agent, or Firm*—Flynn, Thiel, Boutell & Tanis, P.C.

[57] ABSTRACT

According to the invention, the booster is not provided with a brake reaction transmission mechanism, and hence a reaction cannot be transmitted to a brake pedal. On the other hand, a pseudo-reaction imparting means is provided to impart a pseudo-reaction of suitable magnitude which depends on the degree of depression of the brake pedal. The pseudo-reaction imparting means is arranged so that when the brake pedal is depressed relatively rapidly, a relatively smaller braking reaction is imparted than during a usual depression. With this arrangement, the transmission of an abnormally high braking reaction to a driver which is experienced in a conventional booster during a quick braking operation due to an operational rag of the booster is avoided. The pseudo-reaction imparting means allows a reaction of a suitable magnitude which depends on the rate of depression of the brake pedal by a driver to be imparted, thus permitting a high output to be obtained with a reduced force of depression during a quick braking operation.

4 Claims, 3 Drawing Sheets

# REACTION MECHANISM FOR BOOSTER

FIELD OF THE INVENTION

The invention relates to a booster as may be used in a brake of an automobile, and more particularly, to a reaction mechanism for booster which imparts reaction force to an operating rod which actuates the booster.

DESCRIPTION OF THE PRIOR ART

A brake booster is known in the art which comprises a valve body slidably disposed within a shell, a power piston mounted on the valve body, a constant and a variable pressure chamber defined across the power piston, a valve mechanism disposed in the valve body, an input shaft connected to an operating rod and adapted to drive a valve plunger, which forms part of the valve mechanism, back and forth to thereby switch a flow path in the valve mechanism, and an output shaft driven forward as the valve body is driven forward.

A conventional reaction mechanism is provided with a reaction disc formed of rubber and disposed between the output shaft and the valve plunger so that when the brake booster is actuated, both the valve body and the valve plunger are brought into contact with the reaction disc simultaneously, part of a braking force applied to the output shaft being transmitted to the valve body while the remainder thereof is transmitted to the valve plunger, the braking reaction force transmitted to the valve plunger being sensed by a driver through the input shaft and the brake pedal.

A serve ratio of the brake booster can be changed by changing the ratio of the reaction force transmitted to the valve body and the reaction force transmitted to the valve plunger, and more specifically, the ratio of pressure-responsive areas of the both members.

A high serve ratio is generally established in the brake booster so that a braking liquid pressure of an increased magnitude can be developed with a depression of the brake pedal with a reduced force. However, it is found that during a quick braking operation, a serve ratio of a predetermined magnitude cannot be obtained as a result of an operational lag of the brake booster, and it is difficult for a powerless driver such as an aged person or woman to perform a quick braking operation.

More specifically describing the reason, when the brake pedal is depressed, a flow path in the valve mechanism is switched through the input shaft, whereby a pressure fluid is introduced into the variable pressure chamber to drive the power piston and the valve body forward. As the valve body is driven forward, the output shaft is also driven forward through the reaction disc, the forward movement of the output shaft developing a breaking pressure. A reaction therefrom is applied to the output shaft, and the brake reaction applied to the output shaft is distributed between the valve body and the valve plunger in a manner mentioned above.

However, the valve plunger which is connected to the brake pedal through the input shaft will be driven forward before the power piston and the valve body are driven forward by the pressure fluid which is introduced into the variable pressure chamber during a quick braking operation, and as a consequence, a major portion of the braking reaction which is applied to the output shaft will be transmitted to the valve plunger. This results in a braking reaction of an abnormally high magnitude being transmitted to the driver.

Consequently, when a quick braking operation is to be performed, the brake pedal must be depressed by overcoming the abnormally high braking reaction which is transmitted. As compared with a normal braking operation in which the brake pedal is gradually depressed to achieve a high braking force, a braking force of increased magnitude which is required for a quick braking operation cannot be obtained unless the brake pedal is depressed with a force which is much greater than in a normal braking operation.

SUMMARY OF THE INVENTION

In view of the foregoing, the invention provides a reaction mechanism for booster which enables a high output to be obtained with a reduced force of depression during a quick braking operation.

Thus, the invention relates to a booster including a valve body slidably disposed within a shell, a power piston mounted on the valve body, a constant and a variable pressure chamber defined across the power piston, a valve mechanism disposed in the valve body, an input shaft connected to an operating rod for driving a valve plunger, which forms a valve mechanism, back and forth to switch a flow path in the vale mechanism, and an output shaft which is driven forward as the valve body is driven forward. In accordance with the invention, there is provided pseudo-reaction imparting means which prevents the reaction applied to the output shaft during the operation of the booster from being transmitted to the valve plunger and which imparts a pseudo-reaction which depends on a travel of the operating rod to the operating rod.

The pseudo-reaction imparting means comprises a reaction piston slidably mounted on either the power piston or the valve body and which partitions between a second constant pressure, to the rear side of which a pressure from the constant pressure chamber is introduced, and a second variable pressure chamber, to the front side of which a pressure from the variable pressure chamber is introduced. A pressure differential between the second constant pressure chamber and the second variable pressure chamber urges the reaction piston rearward, and the force which urges the rear piston is transmitted, as a pseudo-reaction, to the valve plunger.

If required, an orifice passage may provide a communication between the variable pressure chamber and the second variable pressure chamber.

The described arrangement provides for a mechanism which prevents a reaction applied to the output shaft from being transmitted to the valve plunger when the booster is actuated. Accordingly, during a quick breaking operation, if the valve plunger which is coupled to the operating rod through the input shaft is driven forward before the power piston and the valve body are driven forward by the pressure fluid which is introduced into the valuable pressure chamber during a quick breaking operation, the transmission of a reaction applied to the output shaft through the valve plunger, the input shaft and the operating rod to a driver is prevented.

On the other hand, the pseudo-reaction imparting means is provided with a reaction piston which is subject to a pressure differential between the second constant pressure chamber into which the pressure from the constant pressure chamber is introduced and the second variable pressure chamber into which the pressure from the variable pressure chamber is introduced. The reaction piston is urged rearward by the pressure differential, and the force from the reaction piston is transmitted to the valve plunger as a pseudo-reaction. In this manner, an increase of the reaction to an abnormally high value during a quick breaking operation, as occurs in the prior art, is prevented. By choosing a suitable value of pressure-responsive area of the reaction piston, a high output can be obtained with a reduced force of depression during a quick breaking operation.

In particular, when the second variable pressure chamber is made to communicate with the variable pressure chamber through an orifice passage, the pressure in the second variable pressure chamber rises in delayed relationship with respect to a pressure rise in the variable pressure chamber. Accordingly, the power piston is driven forward in response to a pressure rise in the variable pressure chamber while the pseudo-reaction produced by the reaction piston rises in delayed relationship thereto, thus allowing a high output to be obtained with a more reduced force of depression during a quick breaking operation.

Above an other objects, features an advantages of the invention will become apparent from the following description with reference to the attached drawings.

DETAILED DESCRIPTION OF THE EMBODIMENTS

Figure 1:
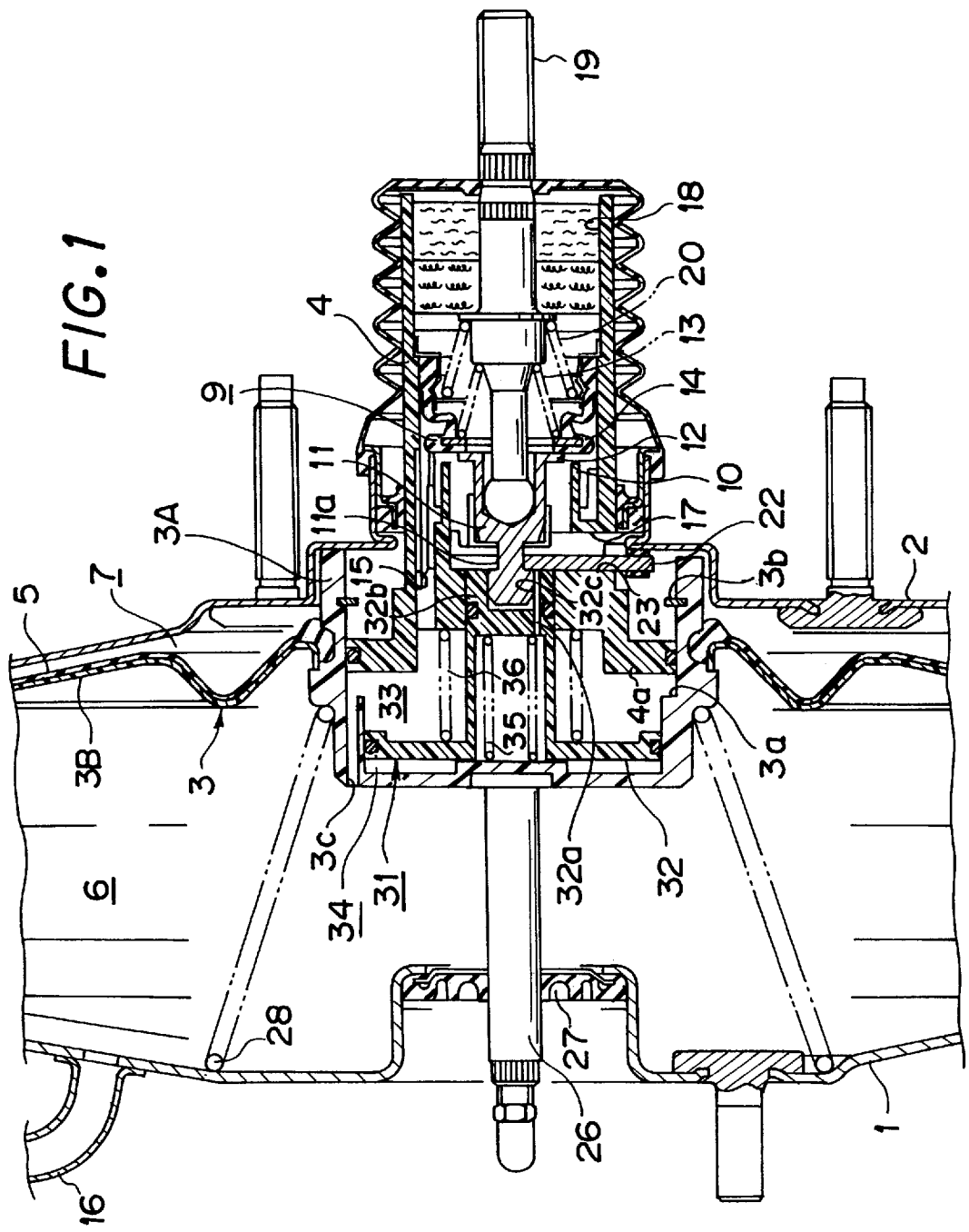
FIG. 1 is a cross section a first embodiment of the invention.

Referring to the drawings, an embodiment of the invention which is applied to a brake booster will now be described. Referring to FIG. 1, a front shell 1 and a rear shell 2 constitute together an enclosed vessel, in which a power piston 3 is slidably disposed. The power piston 3 includes a stepped cylinder member 3A having a closed bottom which is disposed in its axial portion and a dish-shaped plate member 3B secured to the cylinder member 3A.

A piston assembly 4a formed at the front end of a valve body 4 is slidably fitted into the cylinder member 3A of the power piston 3 from the rear side in which the cylinder member has its opening, and is capable of sliding motion between a step 3a formed forwardly on the cylinder member 3A and a retainer 3b mounted rearwardly on the cylinder member 3A.

A diaphragm 5 is applied to the rear side of the plate member 3B which constitutes the power piston 3, thus partitioning the interior of the enclosed vessel into a forwardly located constant pressure chamber 6 and a rearwardly located variable pressure chamber 7. It should be understood that a pressure within the constant pressure chamber 6 acts upon the front end face of the plate member 3B which constitutes the power piston 3, and also acts upon the front end face of the piston assembly 4a which forms the valve body 4 through a passage 3c formed in the cylinder member 3A. A pressure within the variable pressure chamber 7 acts upon the rear end face of the plate member 3B and the rear end face of the piston assembly 4a.

The valve body 4 contains a valve mechanism 9 which switches a fluid circuit. Specifically, the valve mechanism 9 comprises an annular first valve seat 10 formed around the inner periphery of the valve body 4, an annular second valve seat 12 formed on the right end of a valve plunger 11 which is slidably fitted into the valve body 4, and a valve element 14 which is urged from the right, as viewed in FIG. 1, to be seated upon either valve seat 10 or 12 under the influence of a poppet return spring 13.

A space located radially outward of the first valve seat 10 communicates with the constant pressure chamber 6 through an axial constant pressure passage 15 formed in the valve body 4 and a passage 3c formed in the cylinder member 3A, and the constant pressure chamber 6 communicates with an intake manifold of an engine through a tubing 16 mounted on the front shell 1 for introducing a negative pressure. In this manner, a negative pressure is normally introduced into the chamber 6. A space located intermediate the first valve seat 10 and the second valve seat 12 communicates with the variable pressure chamber 7 through a radial variable pressure passage 17 formed in the valve body 4. Finally, a space located radially inward of the second valve seat 12 communicates with the atmosphere through a pressure passage 18 formed in the valve body 4.

The right end of the valve plunger 11 is pivotally connected with a distal end of an input shaft 19, and a valve return spring 20 having a greater resilience than the poppet return spring 13 is disposed between the input shaft 19 and the valve body 4, thus normally maintaining the valve element 14 seated upon the second valve seat 12 of the valve plunger 11 while maintaining the valve element 14 away from the first valve seat 10 on the valve body 4. The other end of the input shaft 19 is coupled to a brake pedal, not shown.

The valve plunger 11 is prevented from being disengaged from the valve body 4 by means of a key member 22. While not shown, the key member 22 is forked in a region from its center toward the distal end thereof, and the key member 22 is inserted into a receiving hole 23 which is diametrically formed in the valve body 4, with the end from which the forked portion extends being engaged with a portion 11a of the valve plunger 11 which has a reduced diameter.

The receiving hole 23 and the variable pressure passage 17 are formed adjacent to each other axially of the valve body 4 so as to be integral, but the width of the receiving hole 23, or the width as measured in a direction which is perpendicular to the axial direction of the valve body 4 and which is orthogonal to the direction in which the key member 22 is inserted into the hole 23, is chosen to be greater than the width of the variable pressure passage 17 measured in the same direction, whereby the key member 22 is displaceable axially of the valve body 4 only within the receiving hole 23.

The key member 22 and the valve plunger 11 are displaceable axially of the valve body 4 within an extent of the axial length of the portion 11a having a reduced diameter. By maintaining the key member 22 in abutment against the inner surface of the rear shell 2 when the brake booster is inoperative to thereby maintain the key member 22 and the valve plunger 11 at an advanced position relative to the valve body 4, a lost motion of the input shaft 19 at the commencement of operation of the brake booster can be reduced.

The left end of an output shaft 26 disposed forwardly of the valve plunger 11 projects externally of the front shell 1 while maintaining a hermitic seal by means of a seal member 27, with the distal end of the output shaft being coupled to a piston of a master cylinder, not shown, which is connected to the front shell 1.

On the other hand, the right end of the output shaft 26 is connected to an axial portion of the cylinder member 3A, whereby a braking reaction which is transmitted from the output shaft 26 during the operation of the brake booster is received by the cylinder member 3A or the power piston 3, and no braking reaction is transmitted to the valve body 4 while also preventing it from being transmitted to the brake pedal through the valve plunger 11.

The power piston 3 is urged to the right by a return spring 28, and is normally maintained in its inoperative position shown where it abuts against the key member 22 which is maintained in abutment against the inner surface of the rear shell 2. At this time, the right end of the cylinder member 3A is substantially in abutment against the inner wall surface of the rear shell 2.

Since the braking reaction is not transmitted to the brake pedal as mentioned previously, a driver cannot obtain a brake operating feeling with the described arrangement alone. Accordingly, pseudo-reaction imparting means 31 is provided to enable a pseudo-reaction which depends on the amount of depression of the brake pedal to be imparted to a driver.

The pseudo-reaction imparting means 31 comprises a reaction piston 32 disposed forwardly of the valve body 4 and which is slidably fitted into the cylinder member 3A. The reaction piston 32 defines a second constant pressure chamber 33 rearwardly of the cylinder member 3A and a second variable pressure chamber 34 forwardly of the cylinder member 3A. The second constant pressure chamber 33 is maintained in communication with the constant pressure chamber 6 through the passage 3c which is formed in the cylinder member 3A, and also communicates with the constant pressure passage 15 formed in the valve body 4. On the other hand, the second variable pressure chamber 34 communicates with the variable pressure passage 17 through an orifice passage 32a formed in the reaction piston 32, and thence to the variable pressure chamber 7.

The reaction piston 32 is formed with a portion 32b of a reduced diameter rearwardly, and such portion 32b is slidably fitted into the valve body 4 while maintaining a hermitic seal, while urging the reaction piston 32 rearward by a spring 35 which is disposed in the second variable pressure chamber 34. The rear end face of the portion 32b having a reduced diameter is formed with a recess 32c, in which the front end of the valve plunger 11 is slidably fitted, whereby the front end face of the valve plunger 11 is disposed in opposing relationship with the bottom of the recess 32c.

The depth or the axial size of the recess 32c is chosen to a given value, and in the inoperative condition shown, the rear end of the portion 32b of a reduced diameter in which the recess 32c is formed abuts against the inner wall surface of the rear shell 2, and hence abuts against the key member 22 which is maintained at an advanced position relative to the valve body 4. In the inoperative condition, a clearance is maintained between the bottom of the recess 32c and the front end face of its opposing valve plunger 11.

By contrast, in the operative condition in which the valve body 4 is driven forward and the key member 22 moves away from the inner wall surface of the rear shell 2, the key member 22, and hence the reaction piston 32, is allowed to retract relative to the valve body 4 to permit an abutment between the bottom of the recess 32c and the front end face of the opposing valve plunger 11 to occur, whereby the force acting from the reaction piston 32 can be transmitted to the brake pedal through the valve plunger 11 and the input shaft 19 as a pseudo-reaction.

Thus, in the present embodiment, the key member 22 constitutes separating means which abuts against the rear shell to separate the reaction piston 32 and its opposing valve plunger 11 from each other during the inoperative condition of the booster.

A return spring 36 is disposed between the reaction piston 32 and the valve body 4 to urge the valve body 4 rearward.

With the described arrangement, when the brake pedal is depressed to drive the input shaft 19 and the valve plunger 11 forward, a flow path in the valve mechanism 9 is switched to introduce the atmosphere into the variable pressure chamber 7, whereby a pressure differential between the constant pressure chamber 6 and the variable pressure chamber 7 drives the power piston 3 forward. The output shaft 26 is then driven forward in integral manner with the power piston 3, whereby a braking liquid pressure is developed in the master cylinder. A braking reaction which results from the braking liquid pressure is transmitted through the output shaft 26 to be received entirely by the power piston 3, and no reaction is transmitted to the valve plunger 11.

On the other hand, when the atmosphere is introduced into the variable pressure chamber 7, the atmosphere is introduced into the second variable pressure chamber 34 through the variable pressure passage 17 and through the orifice passage 32a, whereby the reaction piston 32 is urged rearward by a pressure differential between the second constant pressure chamber 33 and the second variable pressure chamber 34. As mentioned previously, a clearance is maintained between the bottom of the recess 32c and the front end face of the opposing valve plunger 11 in the inoperative condition shown in which the key member 22 abuts against the inner wall surface of the rear shell 2, and hence any pseudo-reaction which is acting upon the reaction piston 32 cannot be transmitted to the valve plunger 11.

By contrast, the pressure differential between the constant pressure chamber 6 and the variable pressure chamber 7 also acts upon the valve body 4, and accordingly, the valve body 4 is driven forward as the power piston 3 is driven forward. As the valve body 4 is driven forward, when the key member 22 moves away from the inner wall surface of the rear shell 2, the key member 22 and the reaction piston 32 are allowed to retract relative to the valve body 4, whereby an abutment occurs between the bottom of the recess 32c and the front end face of the opposing valve plunger 11 to cause a pseudo-reaction which is acting upon the reaction piston 32 to be transmitted to the brake pedal through the valve plunger 11 and the input shaft 19.

Figure 2:
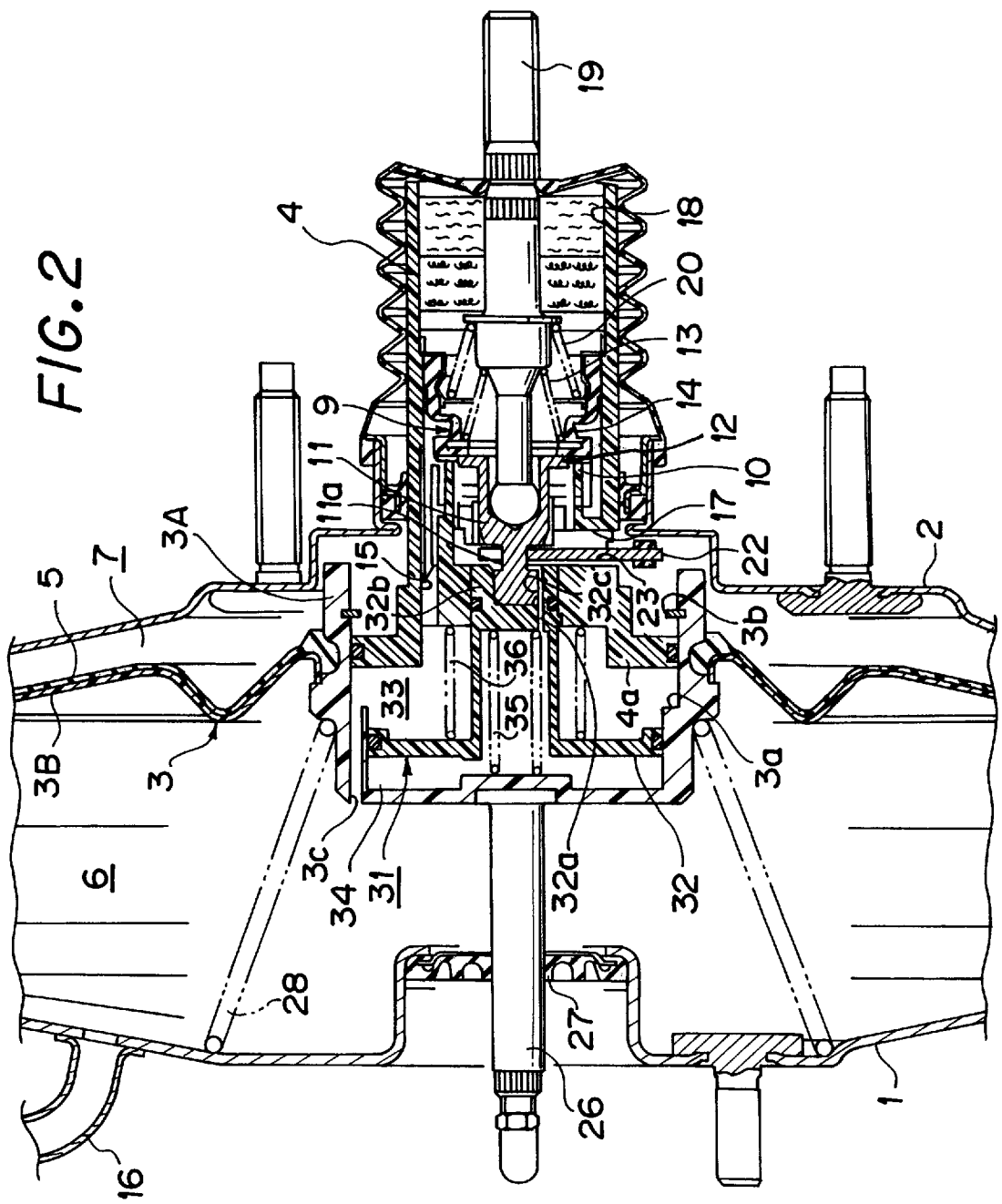
FIG. 2 is a cross section illustrating a different manner of operation from FIG. 1.

FIG. 2 shows a servo balance condition of the brake booster in an intermediate load region. Under this condition, there is achieved a balance in the power piston 3 between a retracting force caused by a braking reaction from the output shaft 26 and the resilience of the return spring 28 and a forward driving force which results from the pressure differential between the constant pressure chamber 6 and the variable pressure chamber 7.

In the valve body 4, a balance is also achieved between the retracting force caused by the resilience of the return spring 36 and the forward driving force which results from the pressure differential between the second constant pressure chamber 33 and the variable pressure chamber 7.

In the reaction piston 32, a balance is also achieved between the retracting force which is caused by the resilience of the spring 35 and the pressure differential between the second constant pressure chamber 33 and the second variable pressure chamber 34 and the force to depress the brake pedal by a driver or the forward driving force from the valve plunger 11.

It will be seen from this servo balance condition that the forward travel of the power piston 3 and the forward travel of the valve body 4 can be separately determined depending on the resilience of the return springs 28, 36 and their pressure-responsive areas. In the present embodiment, the forward travel of the valve body 4 is chosen to be smaller than the forward travel of the power piston 3.

More specifically, a relatively large forward travel is required for the output shaft 26 to which the braking reaction is applied in order to compensate for a lost motion or stroke for the piston of the master cylinder, not shown, or a lost motion or a stroke from the commencement of forward movement of the piston of the master cylinder until the braking liquid pressure rises substantially. By contrast, the forward travel of the valve body can be determined in accordance with the resilience of the return spring 36 and the pressure-responsive area of the piston assembly 4a independently from the magnitude of the braking reaction. As mentioned previously, the forward travel of the valve body 4 is chosen to be smaller than the forward travel of the power piston 3. As a consequence, the stroke of the input shaft 19 which is driven forward as the valve body 4 is driven forward or the stroke of its associated brake pedal can be made relatively small, permitting an improvement in the brake feeling.

Figure 3:
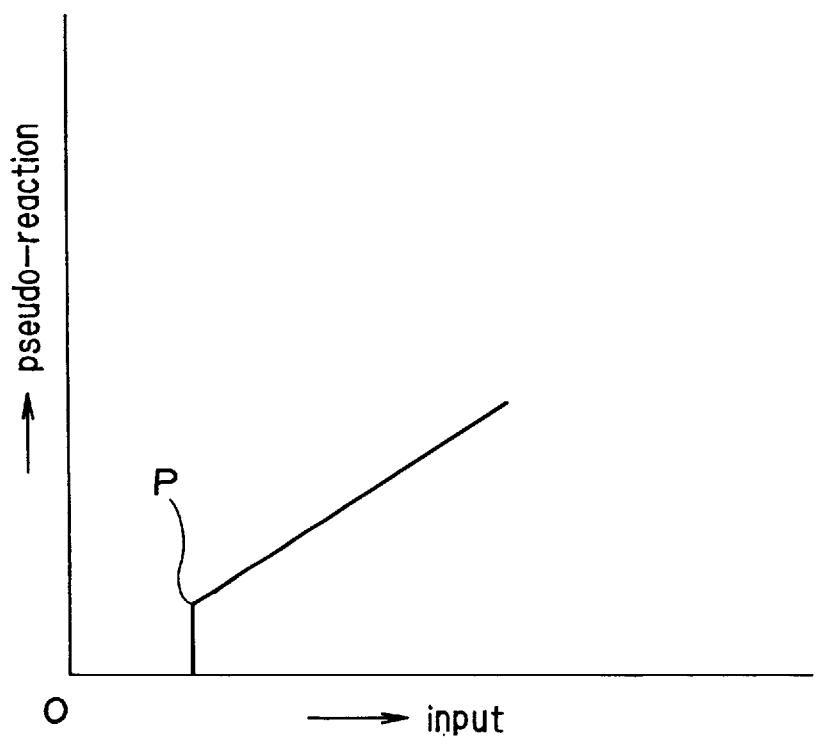
FIG. 3 graphically shows the characteristic diagram of the embodiment.

FIG. 3 graphically shows a relationship between a force of depressing the brake pedal and a pseudo-reaction transmitted to a driver. A point P shown in FIG. 3 indicates the time when the rear end face of the portion 32b of the reaction piston 32 which has a reduced diameter abuts against the front end face of the valve plunger 11.

Thus, in the present embodiment, at the commencement of depression of the brake pedal, the portion 32b of the reaction piston 32 which has a reduced diameter is spaced from the valve plunger 11, and a pseudo-reaction is transmitted to a driver from the time on after the brake booster is actuated and the portion 32b abuts against the valve plunger 11.

As mentioned previously, a balance is achieved in the reaction piston 32 between the retracting force caused by the resilience of the spring 35 and the pressure differential between the second constant pressure chamber 33 and the second variable pressure chamber 34 and the forward driving force caused by the resilience of the return spring 36 and the force of depressing the brake pedal by the driver or from the valve plunger 11. Accordingly, a retracting force which is caused by the pressure differential between the second constant pressure chamber 33 and the second variable pressure chamber 34 is principally transmitted to the brake pedal as a pseudo-reaction. Clearly, the pseudo-reaction depends on the pressure differential between the second constant pressure chamber 33 and the second variable pressure chamber 34, and this pressure differential is equal to the pressure differential between the constant pressure chamber 6 and the variable pressure chamber 7, and the latter pressure differential is controlled in accordance with the magnitude of depression of the brake pedal. Thus, the magnitude of the pseudo-reaction is eventually dependent upon the travel of the brake pedal.

As a consequence, even though a reaction disc which is usually provided in a conventional booster is omitted, a jumping characteristic similar to that occurring in a conventional booster can be obtained at the time the portion 32b of the reaction piston 32 which has a reduced diameter abuts against the valve plunger 11. Subsequently, a pseudo-reaction which is dependent on the degree of depression of the brake pedal is transmitted to a driver. This improves a brake feeling experienced by a driver as compared with an arrangement in which a pseudo-reaction is immediately imparted to a driver upon commencement of depression of the brake pedal.

While a quick braking operation is basically identical to a normal operation, it will be noted that in the present embodiment, the second variable pressure chamber 34 and the variable pressure passage 17 communicate with each other through the orifice passage 32a, and hence, if a pressure in the variable pressure passage 17 and the variable pressure chamber 7 increases rapidly during a quick braking operation, the pressure in the second variable pressure chamber 34 will rise in delayed relationship to the pressure rise in the variable pressure chamber 7.

Consequently, the pseudo-reaction which the pseudo-reaction imparting means 31 imparts to the brake pedal will be smaller during the quick braking operation than during the normal braking operation. In addition, since the occurrence of an abnormally high braking reaction which is experienced in a conventional arrangement during a quick braking operation is avoided, a high braking force can be obtained with a relatively reduced force of depression during a quick braking operation. In this manner, a powerless driver such as an aged person or woman is enabled to perform a quick braking operation in a reliable manner.

In the described embodiment, the valve body 4 is slidably disposed in the power piston, but they may be integral. In such instance, the reaction piston 32 may be slidably disposed in the valve body.

In the described embodiment, a brake pedal is used as an operating rod, which however may be a manual brake lever used by a physically handicapped person. It is also to be understood that the invention is also applicable to a clutch booster, and in this instance, a clutch pedal can be used as an operating rod.

While the invention has been described above in connection with an embodiment thereof, it should be understood that a number of changes, modifications and substitutions therein are possible by one skilled in the art from the above disclosure without departing from the scope and the spirit of the invention defined by the appended claims.

What is claimed is:

1. In a booster including a valve body slidably disposed within a shell, a power piston mounted on the valve body, a constant and a variable pressure chamber defined across the power piston, a valve mechanism disposed in the valve body, an input shaft coupled to an operating rod and adapted to drive a valve plunger back and forth to switch a flow path in the valve mechanism, the valve plunger forming part of the valve mechanism, and an output shaft which is driven forward as the valve body is driven forward;

a reaction mechanism for booster comprising pseudo-reaction imparting means which prevents a reaction applied to the output shaft when the booster is actuated from being transmitted to the valve plunger and which imparts a pseudo-reaction which depends on a travel of the operating rod to the operating rod;

the pseudo-reaction imparting means comprising a reaction piston slidably mounted on either the power piston or the valve body for partitioning between a second constant pressure chamber, to which a pressure in the constant pressure chamber is introduced, and a second variable pressure chamber, to which a pressure in the variable pressure chamber is introduced, the reaction piston being urged rearward by a pressure differential between the second constant pressure chamber and the second variable pressure chamber, and a force acting upon the reaction piston being transmitted to the valve plunger as a pseudo-reaction, and separating means which abuts against the shell in the inoperative condition of the booster to separate the reaction piston and the opposing valve plunger from each other.

2. A reaction mechanism according to claim 1 in which the variable pressure chamber and the second variable pressure chamber communicate with each other through an orifice passage.

3. A reaction mechanism according to claim 1 in which the valve plunger includes a portion of a reduced diameter at a given axial position which is engaged by a key member, the key member and the valve plunger being capable of a relative movement therebetween axially within an extent of the axial size of the portion of the valve plunger which has a reduced diameter, the key member being inserted into a receiving hole formed in the valve body so as to be capable of relative movement axially with respect to the valve body within an extent of the axial size of the receiving hole, the key member including a portion which is located externally of the valve body and which is adapted to abut against the opposing shell, a recess being formed in the rear end face of the reaction piston, a front end of the valve plunger being slidably fitted in the recess, the separating means comprising the key member and a rear portion of the reaction piston where the recess is formed, the key member abutting against the shell in the inoperative condition of the booster, the abutment of the rear end of the reaction piston against the key member being effective to separate the bottom of the recess in the reaction piston and the opposing valve plunger from each other.

4. A reaction mechanism according to claim 3 in which the power piston comprises a cylinder member disposed on the valve body so as to be displaceable relative to the valve body within a given extent, and a plate member extending radially outward from the outer periphery of the cylinder member.

* * * * *

UNITED STATES PATENT AND TRADEMARK OFFICE
CERTIFICATE OF CORRECTION

PATENT NO. : 5,802,952
DATED : September 8, 1998
INVENTOR(S) : Masahiro IKEDA

It is certified that error appears in the above-identified patent and that said Letters Patent is hereby corrected as shown below:

Column 10, line 10; replace "3" with ---1---.

Signed and Sealed this

Fourth Day of May, 1999

Attest:

Q. TODD DICKINSON

Attesting Officer     Acting Commissioner of Patents and Trademarks